Figure 1:
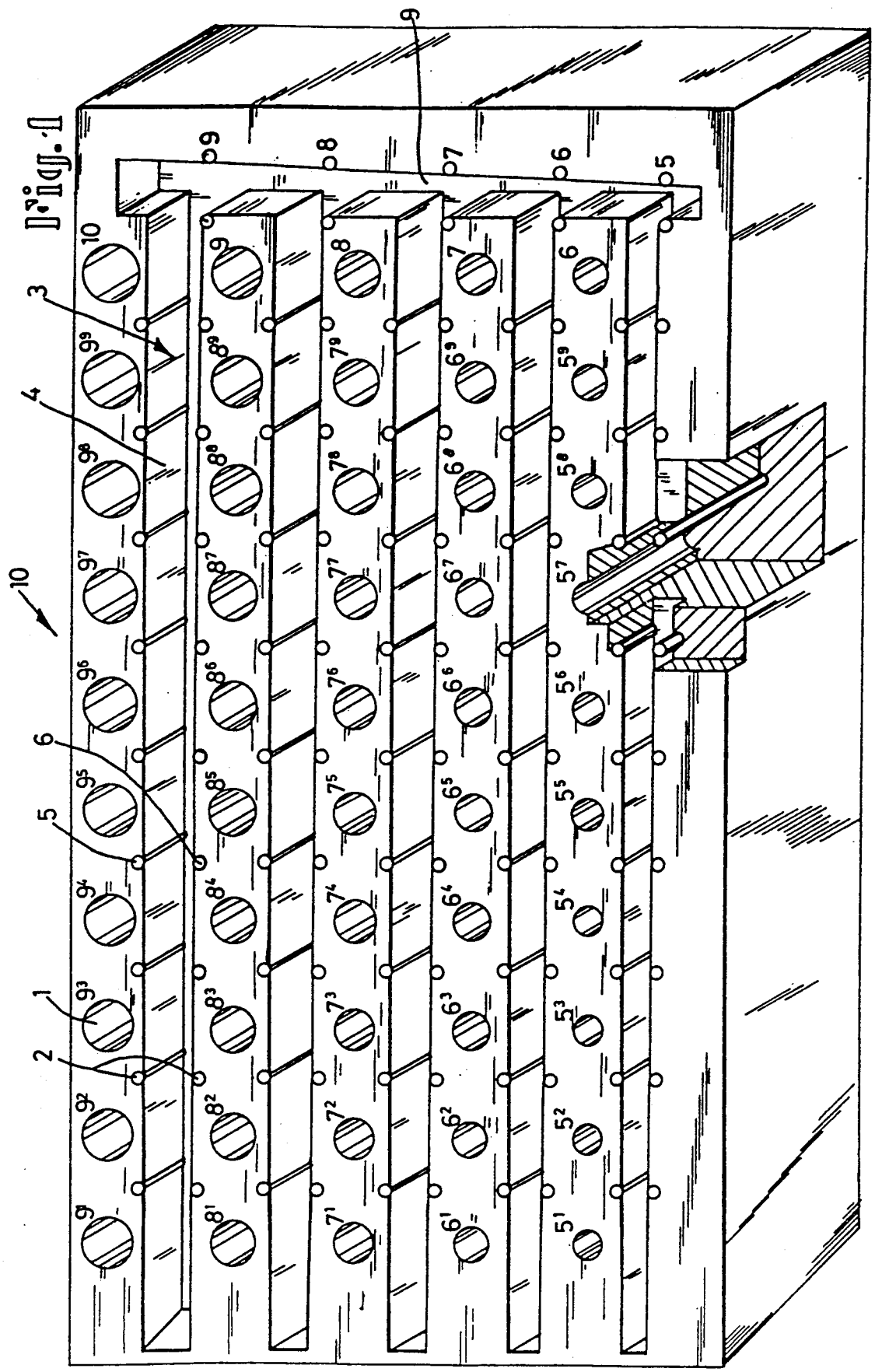

United States Patent [19]
Feder

[11] Patent Number: 5,048,700
[45] Date of Patent: Sep. 17, 1991

[54] TOOL HOLDER

[76] Inventor: Emil Feder, Hannoversche Str. 2, D-3501 Niestetal-Sandershausen, Fed. Rep. of Germany

[21] Appl. No.: 378,230
[22] PCT Filed: Sep. 9, 1988
[86] PCT No.: PCT/DE88/00559
§ 371 Date: Jun. 12, 1989
§ 102(e) Date: Jun. 12, 1989
[87] PCT Pub. No.: WO89/03284
PCT Pub. Date: Apr. 20, 1989

[30] Foreign Application Priority Data

Oct. 12, 1987 [DE] Fed. Rep. of Germany ....... 3734453
Mar. 22, 1988 [DE] Fed. Rep. of Germany ....... 3809492

[51] Int. Cl.$^5$ .............................................. A47F 7/00
[52] U.S. Cl. ................................... 211/70.6; 33/555.2
[58] Field of Search ........................ 33/555.2, 501.45; 211/70.6, 60.1

[56] References Cited

U.S. PATENT DOCUMENTS

| 447,475 | 3/1891 | Pomeroy | 33/555.2 X |
|---|---|---|---|
| 1,025,255 | 5/1912 | Driver | 33/555.2 X |
| 1,389,486 | 8/1921 | Brewer | |
| 1,396,509 | 11/1921 | Faltermayer | 33/555.2 X |
| 2,564,601 | 8/1951 | Huot | |
| 3,127,986 | 4/1964 | Hulka | |
| 3,375,923 | 4/1968 | Leban | |
| 3,382,987 | 5/1968 | Bagian | |
| 3,858,325 | 1/1975 | Goerler | |
| 4,090,302 | 5/1978 | Bollmer | |
| 4,150,488 | 4/1979 | Behnke | |

FOREIGN PATENT DOCUMENTS

| 372681 | 3/1923 | Fed. Rep. of Germany . |
|---|---|---|
| 849069 | 12/1951 | Fed. Rep. of Germany . |
| 1895099 | 6/1964 | Fed. Rep. of Germany . |
| 7504525 | 6/1975 | Fed. Rep. of Germany . |
| 7721646 | 1/1979 | Fed. Rep. of Germany . |
| 7908313 | 10/1979 | Fed. Rep. of Germany . |
| 738672 | 12/1932 | France . |
| 19682 | of 1910 | United Kingdom . |
| 227381 | 1/1925 | United Kingdom . |

Primary Examiner—Blair M. Johnson
Attorney, Agent, or Firm—Peter K. Kontler

[57] ABSTRACT

In the known holders, it can always happen that the tools are not correctly placed in the associated receiving holes so that improper processing of workpieces can thereby occur.

To eliminate this drawback, a holder having a gauge associated with every receiving hole is proposed and an elongated measuring channel defining a fine gauge guide is provided. The gauges are disposed at or in the latter and the receiving holes are provided in the marginal region thereof.

20 Claims, 2 Drawing Sheets

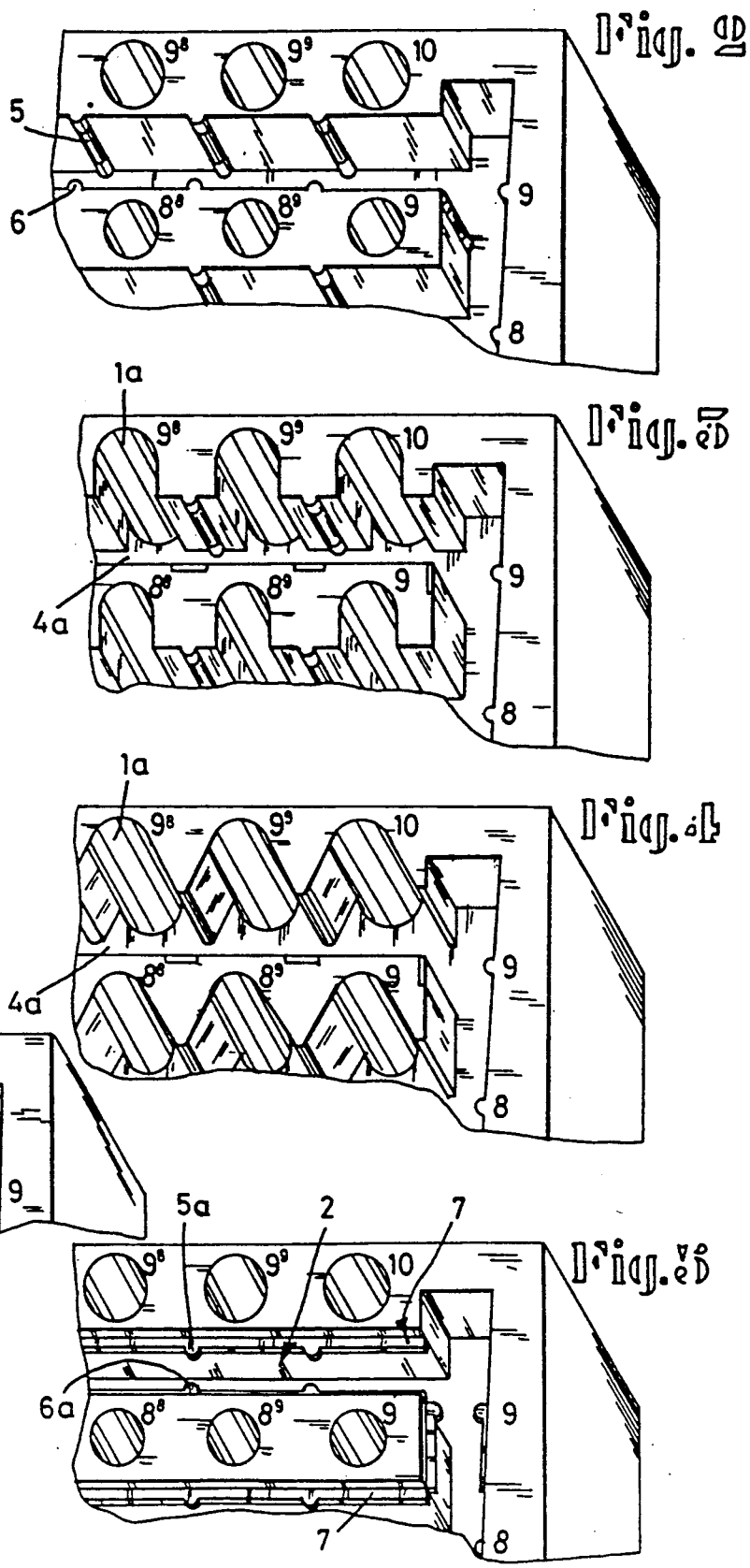

TOOL HOLDER

The invention relates to a tool holder.

Cabinets for the reception and storage of, for example, cylindrical cutters for metal processing, especially drill bits of different diameter—drill bits are always assumed below although the device in accordance with the invention can also be used for cylindrical tools or workpieces of any type—are known and the respective drill bits are inserted in suitably dimensioned storage openings therein for storage and availability. The diameters of the storage openings correspond essentially to the diameters of the respective drill bit. These cabinets come in different dimensions and shapes. Common to all is a bore in the cabinet which matches the particular dimension of the drill bit and, in addition, can be marked with the nominal diameter of the respective drill bit.

The main purpose of these cabinets is to hold the required drill bit in readiness classified by diameter so that the user can locate and again store the desired drill bit more easily. This is more important where drill bits for precision operation are stocked in increments of 0.1 mm. The known cabinets are thus provided with receiving bores of correspondingly narrow tolerances.

When the drill bits being used are in the proper holes, it is easy to locate a particular desired diameter, especially when the nominal diameters are indicated at the holes. Similarly, reinsertion is easy when all of the existing receiving holes are filled with drill bits and only the removed drill bit must once more be inserted in what is then the only available receiving hole. When receiving holes of greatly differing diameter are available, it is also relatively easy to locate the proper hole. Moreover, it is easy to locate the proper receiving hole when the drill bit is new and the nominal diameter stamped therein is still clearly legible. However, due to use, the stamp generally becomes illegible after a very short period and thus becomes unsuitable for determination of the nominal diameter.

A problem arises when receiving holes from adjoining nominal ranges, e.g., 2.3 mm–2.6 mm, are available and the stamped nominal diameters of the drill bits are illegible. If the user is then not completely certain about the diameter, the corresponding receiving hole can only be determined in a time-consuming manner by experimentation. Should this hole increase in diameter, however, due to frequent use, there is a great danger that the respective drill bit will be inserted in the wrong receiving hole. As a result, use of the improperly classified drill bit without a check will result in the production of an improper bore which can make the workpiece unusable and thereby lead to high costs.

In practice, therefore, the drill bits must be measured with a caliper rule prior to storage. Very often, however, this is omitted for the sake of convenience or because no caliper rule is available at the moment. The drill bits are simply randomly inserted in one of the free holes and the abovementioned problem accordingly arises very frequently. Furthermore, the measurement with the caliper rule and the reading of the value, as well as insertion in the appropriate receiving hole, are relatively time-consuming and troublesome.

It is an object of the invention to provide a holder which allows reliable classification of cylindrical workpieces to be accomplished rapidly and without great vigilance.

This object of the invention is achieved in that the holder has a gauge associated with each receiving hole as well as a fine gauge guide in the form of an elongated measuring channel. The gauges are disposed at or in the channel and the receiving holes are provided in a marginal region thereof.

Thus, the invention proposes that an appropriate gauge be associated with each receiving hole of a holder. The gauges are matched to the increment in nominal diameter and can be connected to one another.

In general, drill bits of a specific size are arranged in a row, e.g., the sizes ranging from 4.1 mm to 5.0 mm in increments of 0.1 mm in a first row and the sizes ranging upwards from 5.1 mm to a predetermined drill bit size in increments of 0.1 mm in a second row. The number of rows is arbitrary but, for the sake of expediency, a holder can, for example, be manufactured with size ranges of 1.0 mm–6.0 mm and then 6.1 mm–10.0 mm, etc., so that five rows of drill bits can generally be disposed in a cabinet.

The gauges are advantageously located in front of the corresponding receiving holes but can just as well be located behind the same. Since the arrangement of the receiving holes in the holders is normally such that the smaller dimensions are situated to the left and the larger ones to the right, the gauges are arranged accordingly, that is, the arrangement of the gauges matches the arrangement of the receiving holes.

Likewise, the individual rows of receiving holes can be associated with respective gauges which are set to the largest nominal diameter of the corresponding row and are collectively referred to below as a coarse gauge guide.

In a holder according to the invention, it is now very easy to locate a particular receiving hole. The drill bit need only be introduced into the coarse gauge guide and then moved in a direction towards the smaller sizes until it abuts the gauge for the largest drill bit of the row. A coarse determination is thus achieved and the drill bit can now be shifted sideways along the corresponding row of gauges, i.e., the corresponding measuring channel, for fine determination until it engages the respective matching gauge and can be inserted in the associated receiving hole.

The gauges can be constructed in different ways. Thus, it is possible to provide relatively thin and small gauges adapted to measure the shaft of the drill bit, or gauges having a wide surface for measurement of the nominal diameter of the cutting section. Here, the width is selected in such a manner that, depending upon the nominal diameter of the drill bit, it corresponds to at least half the length of the drill bit pitch. Since drill bit shafts are frequently damaged and do not permit precise measurement, it is preferred to measure the nominal diameter of the cutting section.

The holder can also be used for other tools which may not have a cylindrical shape.

Other advantageous embodiments of the invention are described below with reference to the drawings. In the drawings;

FIG. 1 is a plan view of a first embodiment of a holder in accordance with the invention, FIG. 2 is a fragmentary view of a second embodiment of the holder showing the relationship between the coarse gauge guide, measuring channel and gauges, FIG. 3 is a fragmentary view of another embodiment of the holder, FIG. 4 is a fragmentary view of an additional embodiment of the holder, FIG. 5 is a fragmentary view of a further embodiment of the holder having modified gauges, and FIG. 6 is a fragmentary view of still another embodiment of the holder.

In FIG. 1, a holder, which can also be referred to as a cabinet, is identified by 10 and consists of a block-like part made of plastic, for example. The holder 10 may have a desk-like design in order to provide easy access.

The holder 10 is provided with receiving holes 1 which conform to the respective nominal diameter of the cylindrical tool. In the drawing, these nominal diameters are shown in association with the receiving holes 1.

Measure channels 4, which constitute fine gauge guides 3 and in which a gauge 2 is assigned to each receiving hole 1, are associated with the receiving holes 1. In the exemplary embodiment illustrated in FIG. 1, each gauge 2 is formed by abutments 5 and 6 which extend over the entire height of the respective measuring channel 4 and consist of wear-resistant material. Considering the receiving hole having a size of 9.5 mm, it is clear that the two abutments 5,6 which are located to the left of the same must be spaced from one another by precisely 9.4 mm. A drill bit having a nominal diameter of 9.4 mm or less can be passed through the space, defined by the abutments 5 and 6 while a drill bit having a nominal diameter in excess of 9.4 mm cannot be passed through. The drill bit in question then has a size of 9.5 mm and can be inserted in the receiving hole identified by the code 9.5. Since the gauges for nominal drill bit diameters of 9.6 and greater are located before the receiving hole 9.5, i.e., the gauge for 9.5 mm is located before the hole 9.5, only a drill bit having a diameter of maximum 9.5 mm will be able to pass this gauge and penetrate to the gauge 9.4. A drill bit having a diameter of 9.6 mm will not be able to enter the hole 9.5 because it cannot pass the preceding gauges.

The measuring channels 4 open into a measuring channel 9 which constitutes a coarse gauge guide. Cooperating gauges made up of abutments 5 and 6 are provided here also and a drill bit inserted in the measuring channel 9 can therefore be passed through the measuring channel 9 only when it has a nominal diameter smaller than the respective gauge which has been reached and consists of the abutments 5 and 6.

The receiving holes 1 have a depth which is greater than the depth of the measuring channel 4. Accordingly, the drill bits are so deeply seated in the receiving holes that drill bits to be guided in the measuring channels 4 and 9 can be manipulated without problem. This is particularly clear from the cutaway showing at the bottom of FIG. 1.

In the exemplary embodiment of FIG. 2, the holder 10 consists generally of plastic and a portion of each abutment 5 and 6 extending over only part of the height of the respective gauge is composed of another material.

While the receiving holes 1 do not communicate with the measuring channels 4 in the embodiments of FIGS. 1 and 2, the receiving holes 1a open to the measuring channels 4a in the embodiments of FIGS. 3 and 4. In this manner, it becomes possible to simplify transfer of the cylindrical workpiece from the measuring channel into the receiving openings.

In the embodiment of FIG. 5, the gauges 2 do not consist of opposed abutments 5 and 6 but, instead, are constituted by guide strips 7 which are provided with projections 5a and 6a forming respective gauges. This arrangement is particularly well-suited for measurement of the drill bit shaft. A shear-like sheet metal strip can also be provided as per FIG. 6.

If the cutting section of the drill bit is to be measured, it is necessary for the abutments 5 and 6 to extend over at least half the length of a drill bit pitch taking into consideration the nominal diameter of the drill bit.

Not illustrated in the drawing but falling within the scope of the invention is the possibility that the holder is equipped with a cover. The receiving holes 1 can then be disposed in the base portion of the holder and the measuring channels 4 and 9 with the associated gauges in the cover. In this manner, the operation of the device can be further improved. The gauges can also be disposed in the base portion at the front wall or the side wall.

I claim:

1. A holder for articles of different cross-sectional area, particularly for tools having cylindrical sections of different diameter, comprising a support; at least one set of apertures of different cross-sectional area in said support for accommodating respective articles; and at least one gauge in said support for establishing the cross-sectional areas of the articles, said one gauge including at least one channel arranged to extend, and designed to receive the articles accommodated, by the apertures of said one set, and said one gauge further including a gauging element for each aperture of said one set, said gauging elements being disposed along said one channel, and each of said gauging elements representing a cross-sectional area which at least approximates the cross-sectional area of the respective aperture, said one channel opening to and at least partly bounding the apertures of said one set.

2. A holder for articles of different cross-sectional area, particularly for tools having cylindrical sections of different diameter, comprising a support; at least one set of apertures of different cross-sectional area in said support for accommodating respective articles; and at least one gauge in said support for establishing the cross-sectional areas of the articles, said one gauge including at least one channel arranged to extend, and designed to receive the articles accommodated, by the apertures of said one set, and said one gauge further including a gauging element for each aperture of said one set, said gauging elements being disposed along said one channel, and each of said gauging elements representing a cross-sectional area which at least approximates the cross-sectional area of the respective aperture, each aperture of said one set being designed to accommodate a drill bit having a respective pitch and each of said gauging elements having a length at least equal to one-half of the respective pitch.

3. A holder for articles of different cross-sectional area, particularly for tools having cylindrical sections of different diameter, comprising a support; at least one set of apertures of different cross-sectional area in said support for accommodating respective articles; and at least one gauge in said support for establishing the cross-sectional areas of the articles, said one gauge including at least one channel arranged to extend, and designed to receive the articles accommodated, by the apertures of said one set, and said one gauge further including a gauging element for each aperture of said one set, said gauging elements being disposed along said one channel, and each of said gauging elements representing a cross-sectional area which at least approximates the cross-sectional area of the respective aperture, each aperture of said one set being designed to accommodate a drill bit having a respective pitch and the depth of said one channel in the region of each of said gauging elements being equal to at least one-half of the respective pitch.

4. The holder of claim 3, further comprising another set of apertures, and second and third gauges in said support for establishing the cross-sectional areas of articles, said second gauge including a second channel arranged to extend, and designed to receive the articles accommodated, by the apertures of said other set, and said second gauge further including a gauging element for each aperture of said other set, said gauging elements of said second gauge being disposed along said second channel, and each gauging element of said second gauge representing a cross-sectional area which at least approximates the cross-sectional area of the respective aperture, said third gauge including a third channel extending transverse, and opening, to said one channel and said second channel, and said third channel being designed to receive articles accommodated by the apertures of said one and other sets, said third gauge further including a gauging element for each of said sets, and said gauging elements of said third gauge being disposed along said third channel, each gauging element of said third gauge representing a cross-sectional area which at least approximates the cross-sectional area of the smallest aperture of the respective set.

5. The holder of claim 4, wherein said one and second channels are substantially parallel to one another.

6. The holder of claim 5, wherein said third channel is substantially perpendicular to said one and second channels.

7. The holder of claim 3, wherein each of said gauging elements comprises a pair of opposed abutments projecting into said one channel from opposite sides thereof.

8. The holder of claim 7, wherein said abutments comprise a wear-resistant material.

9. The holder of claim 3, comprising a plate-like element having a portion which projects into said one channel and at least in part defines said gauging elements.

10. The holder of claim 9, wherein said portion of said plate-like element extends along substantially the entire length of said one channel.

11. The holder of claim 9, wherein said portion of said plate-like element comprises a wear-resistant material.

12. The holder of claim 3, comprising a pair of strip-like elements extending along said one channel at opposite sides thereof, each of said gauging elements including a pair of opposed abutments projecting into said one channel from respective ones of said strip-like elements.

13. The holder of claim 12, wherein said strip-like elements comprise a wear-resistant material.

14. The holder of claim 3, wherein said one channel has a first depth and each aperture of said one set has a greater depth.

15. The holder of claim 3, wherein said support comprises plastic.

16. The holder of claim 15, wherein said gauging elements comprise metal.

17. The holder of claim 3, wherein said support has a desk-like configuration.

18. The holder of claim 3, wherein said one channel is untapered.

19. The holder of claim 3, wherein said one gauge is adjacent to the apertures of said one set.

20. The holder of claim 3, wherein the apertures of said one set are arranged in a row and said one channel is substantially parallel to said row.

* * * * *